United States Patent
Dehrmann et al.

[19]
[11] Patent Number: 5,988,981
[45] Date of Patent: Nov. 23, 1999

[54] PUMP IMPELLER FOR A TORQUE CONVERTER

[75] Inventors: Uwe Dehrmann, Würzburg; Wilfried Glock, Dittelbrunn/Hambach; Rüdiger Hinkel, Rüthlein/Heidenfeld; Rothard Schneider, Bad Königshofen; Peter Volland, Gerolzhofen; Reinhold Weckesser, Euerbach-Obbach; Hans-Wilhelm Wienholt, Schweinfurt, all of Germany

[73] Assignee: Mannesmann Sachs AG, Schweinfurt, Germany

[21] Appl. No.: 09/025,158

[22] Filed: Feb. 18, 1998

[30] Foreign Application Priority Data

Feb. 20, 1997 [DE] Germany ............... 197 06 735

[51] Int. Cl.⁶ ........................................... F16H 41/24
[52] U.S. Cl. ........................... 416/197 C; 384/296
[58] Field of Search ..................... 416/174, 180, 416/197 C; 415/229; 384/147, 275, 296, 297, 299

[56] References Cited

U.S. PATENT DOCUMENTS

| | | | |
|---|---|---|---|
| 863,089 | 8/1907 | Powell | 384/296 |
| 1,342,845 | 6/1920 | Elliott | 416/229 X |
| 2,429,503 | 10/1947 | Zeidler | 416/180 |
| 2,474,298 | 6/1949 | Zeidler | 416/180 |
| 2,692,561 | 10/1954 | Zeidler | 416/180 |
| 2,917,001 | 12/1959 | Zeidler et al. | 416/180 |
| 3,167,918 | 2/1965 | Alexandrescu | 416/180 X |
| 4,059,365 | 11/1977 | Ivey et al. | 416/174 |
| 4,878,767 | 11/1989 | Halder | 384/275 X |
| 5,062,654 | 11/1991 | Kakimoto et al. | 384/147 X |
| 5,271,716 | 12/1993 | Ejiri | 416/180 |
| 5,299,677 | 4/1994 | Caillaud et al. | 384/296 X |

FOREIGN PATENT DOCUMENTS

| | | |
|---|---|---|
| 31 44 194 | 7/1982 | Germany . |
| 43 44 562 C1 | 6/1995 | Germany . |
| 44 36 505 | 4/1996 | Germany . |
| 54-81460 | 6/1979 | Japan . |
| 59-112007 | 7/1984 | Japan . |
| 59-1660-24 | 11/1984 | Japan . |
| 3-55954 | 5/1991 | Japan . |
| 5-14576 | 2/1993 | Japan . |
| 5-96608 | 12/1993 | Japan . |

*Primary Examiner*—John E. Ryznic
*Attorney, Agent, or Firm*—Cohen, Pontani, Lieberman & Pavane

[57] ABSTRACT

A pump impeller for a hydrodynamic torque converter with a flange and a hub located radially inside and extending in the axial direction. The hub has a seat for a bearing and a sleeve is connected by a pressure fit to the pump impeller. The sleeve extends in the direction of the hub and forms the seat of the bearing.

6 Claims, 2 Drawing Sheets

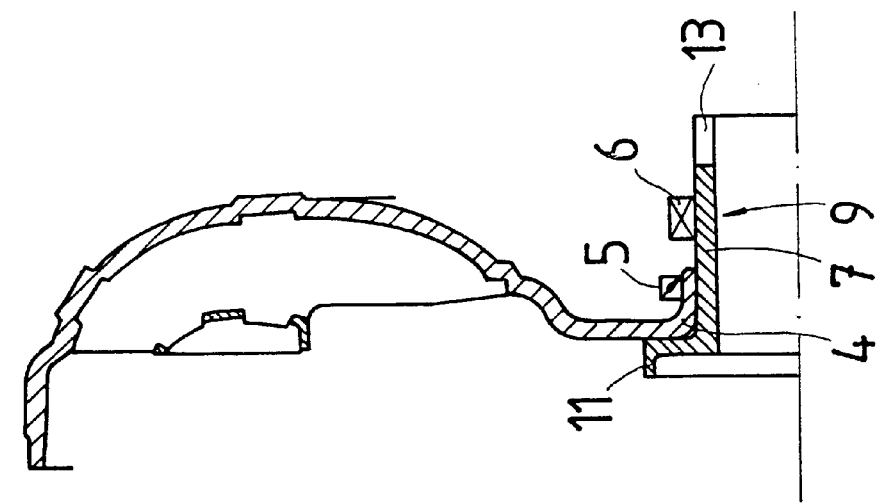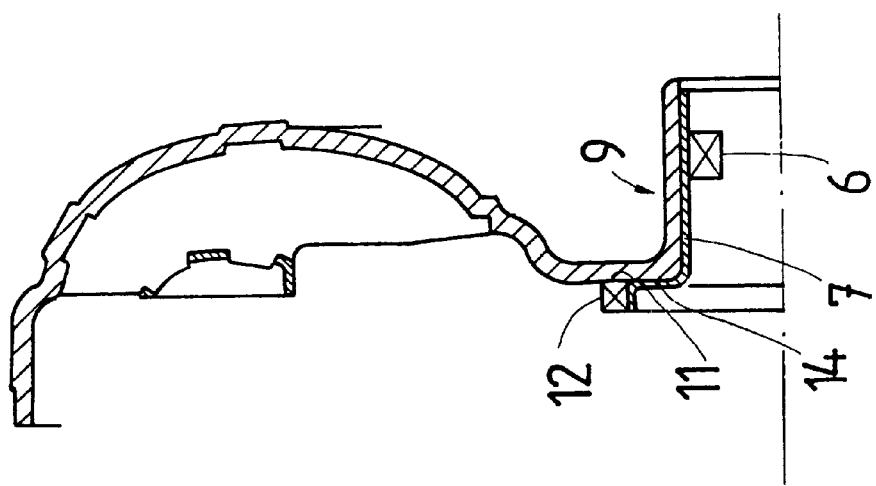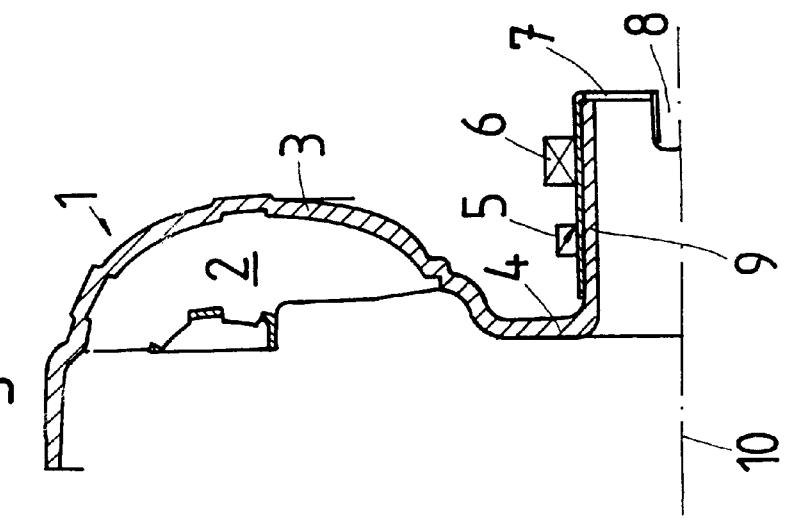

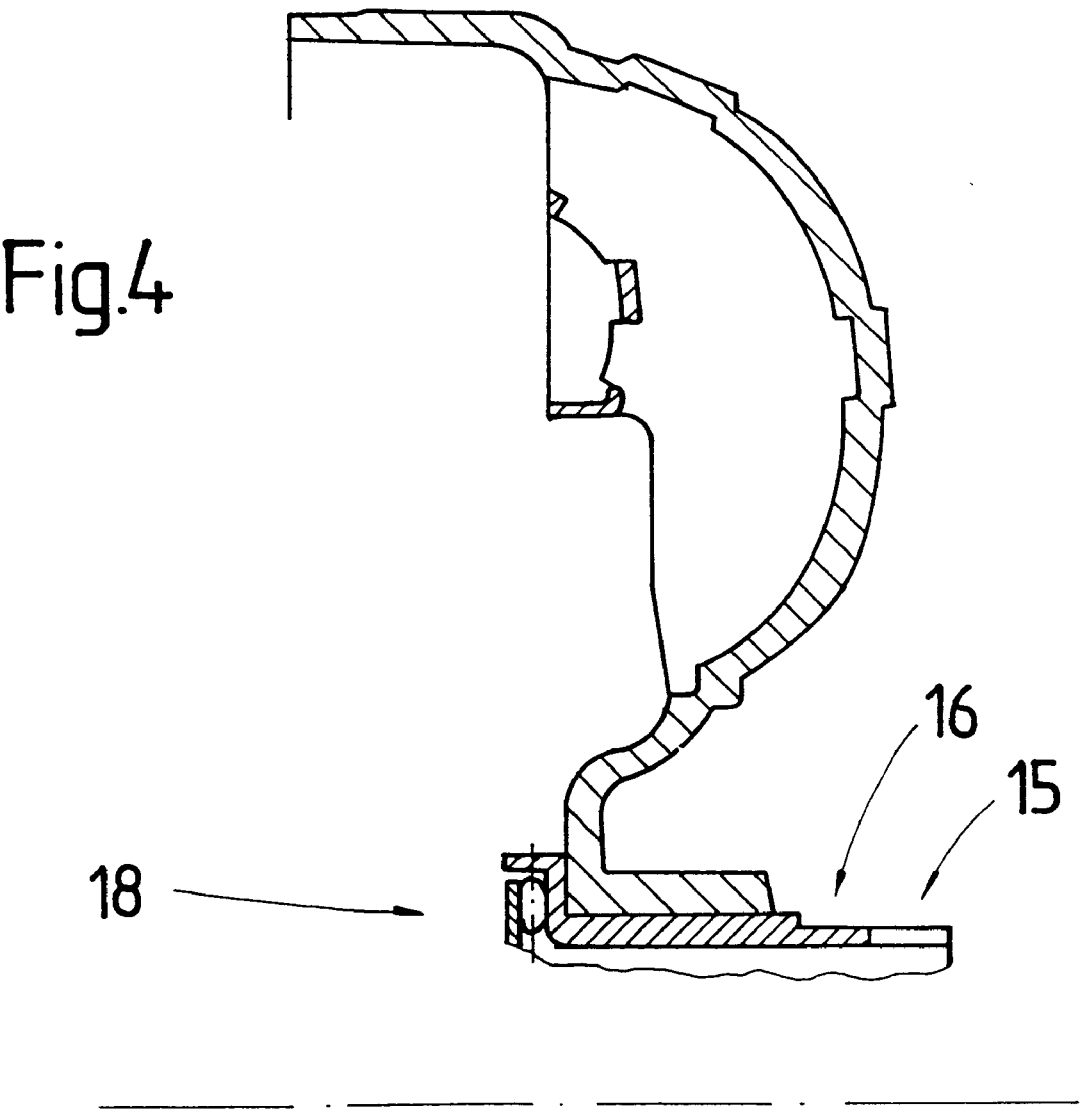

PUMP IMPELLER FOR A TORQUE CONVERTER

BACKGROUND OF THE INVENTION

1. Field of the Invention

The invention relates to a pump impeller for a hydrodynamic torque converter with a flange and a hub located radially inside and extending in the axial direction. A seat for a bearing is formed on the hub.

2. Discussion of the Prior Art

A pump impeller of this type is known, for example, from German reference DE 43 44 562 C1. In this reference the pump impeller is driven by the crank shaft of an internal combustion engine, which crank shaft is connected to the hub.

The pump impeller is usually designed as a drawn sheet-metal part. Because the seat of the bearing is on the hub, the hub must be precisely worked radially inside or radially outside. In addition, higher strength requirements are placed on the hub than on the outer shell of the pump impeller. To economically fulfill these two demands, the hub in the known pump impeller is made of a different material than the outer shell and is connected by a friction weld connection to a flange mounted radially inside the outer shell.

Pump impellers are also known in which the hub is welded directly to the outer shell or is embodied in one piece therewith.

A weld connection has the disadvantage that the hub and the flange or outer shell must be previously centered relative to each other. In addition, the welded connection must be produced with care to avoid later failures of the torque converter due to cracks or the like in the weld seam. Because the hub can warp during welding, the bearing seat cannot be produced until after the two parts are connected. Handling the pump impeller is then complicated, because of its shape.

SUMMARY OF THE INVENTION

Starting from these problems, it is an object of the present invention to provide a pump impeller that is easier to produce than was previously possible.

Pursuant to this object, and others which will become apparent hereafter, one aspect of the present invention resides in a sleeve which is connected via a pressure fit to the pump impeller. The sleeve extends in the direction of the hub and forms the seat of the bearing. It is advantageous that the sleeve can be designed in a highly wear-resistant manner, and therefore provides good protection against material wear depressions resulting, for example, from the circumferential forces of an oil pump drive.

The sleeve, which is already a finished part when connected to the pump impeller, is simply pressed or driven into the latter. Further machining of the pump impeller is unnecessary.

The sleeve can b e connected to a flange or hub that is to be embodied on the pump impeller. By calibrating the pump impeller, a suitable diameter to accommodate the sleeve can be created, while operational precision is provided by the sleeve itself.

When the sleeve is to form the seat for the inner ring of the bearing, the sleeve can be placed on the hub radially outside. In pump impellers mounted radially inside, in which the hub forms the seat for the outer ring of the bearing, the sleeve is placed in the hub radially inside.

Preferably, a seat for a seal is also embodied on the sleeve.

When the sleeve is equipped with a flange that projects radially into the pump impeller, the flange can serve as a stop for the secure axial fixing of the sleeve in the pump impeller. In addition, the seat for an axial bearing can be embodied on the flange.

Preferably the sleeve is equipped with a slot for the drive of an oil pump. A carrier dog of the driving wheel of the oil pump engages into this slot.

Instead of equipping the sleeve with a slot for the drive for the oil pump, a driving carrier or a flattened surface can be provided on the sleeve. The carrier device on the pump hub can also be embodied to match the mating surface on the oil pump.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The drawings show:

FIG. 1 is a schematic view of a first embodiment of a pump impeller pursuant to the present invention in half section;

FIG. 2 is a schematic view of a second example of a pump impeller in half section;

FIG. 3 is a schematic view of a third example of a pump impeller in half section; and FIG. 4 is a schematic view of a fourth example of a pump impeller in half section.

DETAILED DESCRIPTION OF THE PREFERRED EMBODIMENTS

The pump impeller 1 is embodied symmetrically relative to the rotational axis 10 and comprises essentially an outer shell 3, a blade 2 connected to the outer shell 3, a flange 4 attached to the outer shell 3 radially inside, and a hub 9. A sleeve 7 that forms the seat for a bearing 6, 6' is connected to the pump impeller by a pressure fit.

As FIG. 1 shows, the sleeve 7 can be pressed onto a radially outward side of the hub 9 and can carry, along with the bearing 6, a seal 5. In this embodiment, the housing of the pump impeller 1 is drawn from a single piece. During the drawing process, the housing region (outer shell 3) for the arrangement of both the blade 2 and the hub 9 is created. The sleeve 7 is finished prior to being connected to the pump impeller 1. Via a projection 8, the sleeve 7 engages into a slot for the work drive of the oil supply pump (not shown here in greater detail). By means of this design and the selection of suitably high-grade material, it is possible to effectively avoid diggings or wear depressions of the dog of the driving wheel of the oil pump.

In the embodiment in FIG. 2, the sleeve 7 is pressed or driven radially inside the hub 9 of the pump impeller 1. The sleeve 7 is equipped with a flange 14, which projects radially outwardly into the pump housing and serves as a stop to axial fix the sleeve 7 on the flange 4 of the pump impeller 1. The flange 14 has a radially outward portion that is angled axially to form a seat 11 for an axial bearing 12. In this embodiment, the seat of the bearing 6' is embodied radially inside in the sleeve 7.

In the embodiment shown in FIG. 3, the sleeve 7 also forms the hub 9. While the seat of the bearing 6 is embodied on a radially outward side of the sleeve 7, the seal 5 is arranged on a continuation of the flange 4 angled in the axial direction. This arrangement ensures an absolutely oil-tight seal toward the outside. The dog of the driving wheel (not shown) of the oil pump can engage into the slot 13. The sleeve 7 can also be pressed into the pump impeller 1 via a "mouse toothing", the latter being provided on the sleeve only on the angled continuation of the flange 4.

As FIG. 4 shows, the axial bearing 18 can also be run farther radially inside on the seat 11 of the flange 14. Preferably, the flange 14 simultaneously forms a running surface 17 of the bearing 18, so that a bearing component can be dispensed with. A drive carrier 15 is formed on the sleeve 7 for the oil pump drive. Alternatively, the sleeve 7 can have a flattened surface 16 for the oil pump drive.

The invention is not limited by the embodiments described above which are presented as examples only but can be modified in various ways within the scope of protection defined by the appended patent claims.

We claim:

1. A pump impeller for a hydrodynamic torque converter, comprising:

a flange;

a hub arranged radially inside the flange so as to extend in an axial direction; and a sleeve connected by a pressure fit to the hub so as to extend in the direction of the hub and form a bearing seat, the sleeve being configured to form the hub.

2. A pump impeller as defined in claim 1, wherein the sleeve has a flattened surface for an oil pump drive.

3. A pump impeller for a hydrodynamic torque converter, comprising:

a flange;

a hub arranged radially inside the flange so as to extend in the axial direction; and a sleeve connected by a pressure fit to the hub so as to extend in the direction of the hub and form a bearing seat, the sleeve having a flange that projects radially into the pump impeller.

4. A pump impeller as defined in claim 3, and further comprising an axial bearing, the flange being configured to form a seat for the axial bearing.

5. A pump impeller as defined in claim 3, and further comprising an axial bearing, the flange being configured to form a running surface for the axial bearing.

6. A pump impeller for a hydrodynamic torque converter, comprising:

a flange;

a hub arranged radially inside the flange so as to extend in an axial direction; and a sleeve connected by a pressure fit to the hub so as to extend in the direction of the hub and form a bearing seat, the sleeve having a flattened surface for an oil pump drive.

* * * * *